(12) United States Patent
Hinch et al.

(10) Patent No.: US 7,366,198 B2
(45) Date of Patent: Apr. 29, 2008

(54) METHOD AND SYSTEM FOR PACKET AND CIRCUIT TELEPHONY IN A DISTRIBUTED TELECOMMUNICATIONS SWITCHING SYSTEM

(75) Inventors: Tina Lee Hinch, Naperville, IL (US); Mann-Yi Hsieh, Downers Grove, IL (US); Chung-You Patrick Liu, Naperville, IL (US); Anthony Murphy Scafidi, Northfield, IL (US); Charles Arthur Witschorik, Naperville, IL (US); James Wu, Naperville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 1025 days.

(21) Appl. No.: 10/384,159

(22) Filed: Mar. 7, 2003
(Under 37 CFR 1.47)

(65) Prior Publication Data
US 2004/0174861 A1    Sep. 9, 2004

(51) Int. Cl.
*H04L 12/66* (2006.01)
(52) U.S. Cl. .................. 370/466; 370/353; 379/201.02
(58) Field of Classification Search ................ 370/350, 370/351, 352, 396, 465, 353, 466; 379/201.02
See application file for complete search history.

(56) References Cited

U.S. PATENT DOCUMENTS

| | | | |
|---|---|---|---|
| 5,592,477 A * | 1/1997 | Farris et al. | 370/396 |
| 2002/0064147 A1 | 5/2002 | Jonas et al. | |
| 2002/0075881 A1 | 6/2002 | Yoakum et al. | |
| 2003/0099227 A1* | 5/2003 | Yoo | 370/352 |
| 2003/0118009 A1* | 6/2003 | Hoffmann | 370/352 |

FOREIGN PATENT DOCUMENTS

| | | |
|---|---|---|
| GB | 2 315 190 | 1/1998 |
| WO | WO 97/16007 | 5/1997 |

* cited by examiner

*Primary Examiner*—Gerald Gauthier

(57) ABSTRACT

Methods and systems for interfacing packet and circuit telephony operations in a distributed telecommunications network. Initially, one or more digital circuit switches can be associated with the distributed telecommunications network. Thereafter, one or more network transmission elements within the distributed telecommunications network can be connected to one or more of the digital circuit switches. One or more broadband switches can then be associated with one or more of the network transmission elements, such that the broadband switches thereof interface with network transmission elements and the digital circuit switches to coordinate combined circuit and packet signaling, routing and calling processing services among varying terminals of the distributed telecommunications network.

20 Claims, 7 Drawing Sheets

METHOD AND SYSTEM FOR PACKET AND CIRCUIT TELEPHONY IN A DISTRIBUTED TELECOMMUNICATIONS SWITCHING SYSTEM

TECHNICAL FIELD

The present invention is generally related to telecommunications networks. The present invention is additionally related to telecommunications switching networks. The present invention is also related to telecommunications network architectures that provide communications among varying calling parties in multiple switching networks.

BACKGROUND OF THE INVENTION

Telecommunications switching networks traditionally have included SS7 signaling capabilities for communications over a telephone-signaling network. Such communications are primarily carried out utilizing a 64 kbits/s bearer channel that utilizes time division multiplexing (TDM,) and which is usually referred to as a narrowband network. This traditional switching network can be manufactured and supported by devices and systems such as the 5ESS® Switch which is manufactured by Lucent Technologies. A new generation of digital switching systems is evolving utilizing higher-bandwidth bearer channels and optical cable (OC) interfaces as the transmission medium to carry data and voice traffic. This new type of switch can provide significant bandwidth improvement, and is usually referred to as a broadband switch.

To inter-network bearer traffic between narrow and broadband switches, switch operators have begun utilizing transmission network elements to interface between narrowband (e.g., TDM) and broadband networks where the transmission network element requires no change to the narrowband switch transmission and signaling interfaces or procedures. At the same time, an on-going control information signaling standard, which is known as a Bearer Independent Call Control (BICC), and which is currently under development by the ITU standard committee and industry accepted procedures such as Internet Device Control Protocol (IPDC), can distribute and provide signaling, control and user information directly between narrowband and broadband network elements FIG. 1 depicts a block diagram generally illustrative of a prior art telecommunication circuit switch network 100 associated with a switch office. Network 100 generally includes an administrative module 102, which can communicate with a communication module 104 that in turn can communicate with a switching module 106, a switching module 108 and/or a number of other switching modules, up to and including a switching module 192.

FIG. 2 illustrates a block diagram of the 64 kbps channel network for a prior art switching module 200, which can include a telephone line/trunk unit (LTU) 208 that communicates with a time slot Interface (TSI) 210 and a TSI 202. Switching module 200 can also include a LTU 206 that also can communicate with TSI 210 and a TSI 202. A digital line interface (DLI) 212 and DLI 204 can also be included in switching module 200 and can both communicate with TSI 202 and TSI 210. Through TSI 202 and 210, any of LTU 206, LTU 208, DLI 204 and DLI 212 can communicate with each other. TSI 202 and 210 provide duplicated paths between units as a part of the redundancy and reliability architecture of digital circuit switching module 200. In time division multiplexing and/or switching, the term "time slot" typically refers to a slot belonging to voice, data or video conversation, which can be occupied with conversation or simply left blank. The slot, however, always remains present. The capacity of the switch or transmission channel can be determined by keeping track of the number of slots present. A "time slot interface" or TSI is thus limited in the number of conversations it can support by the number of time slots it can interchange from one unit to another.

FIG. 3 depicts a block diagram of a prior art circuit switch telephone call path configuration 300. In this figure, the redundancy and reliability architecture of the digital switch is implicit. For example, TSI 328 in switching module 320 represents two physical TSI mechanisms that interconnect, for example, LTU 324 and DLI 326. As indicated in FIG. 3, a communications module 302 is composed of a switching fabric time-multiplexed switch (TMS) 304, which is generally associated with a link interface (LI) 306, and link interfaces 310, 312, and 314. Communications module 302 thus can communicate with prior art switching modules 320 and 330. Switching module 320 is composed of an LTU 324 and an LTU 322, which can communicate with a TSI 328, which in turn communicates with a DLI 326. Similarly, prior art switching module 330 includes an LTU 334 and an LTU 336, which communicates with a TSI 340, which in turn can communicate with a DLI 338. LTU 336 of switching module 330 can communicate with a terminal 344 (e.g., a telephone), while LTU 324 of switching module 320 can communicate with a terminal 342.

In general, a circuit switch provides a physical, dedicated path (i.e., time slot) for a call when it goes through the switching matrix. Because this path is dedicated to the call, no other callers can use that switch path until the call is ended. Since the call has an end-to-end dedicated circuit for the duration of the call, the switch is called a circuit switch. Circuit switching is used for voice switching and to support data services that have a constant bit rate (CBR). Circuit switching is called synchronous because the user's information is transmitted in a specific time slot, and only in that time slot.

Indeed, today's voice or telephone networks use this concept of a dedicated path, not just in the switch but through all transmission portions of the network as well. When a person places a voice call, a dedicated path is established through every switch and transmission line needed to connect the call before the person being called ever hears the telephone ring. This concept of a dedicated path guarantees high-quality, almost error-free transmission for the call. And since the average voice conversation is about three to four minutes long, network switch resources used to set up the path can be reused over and over during the course of the day.

Packet switches, in contrast, do not utilize dedicated paths. Packet switches originally were designed for data traffic that comes in bursts with a variable bit rate (VBR), so switching resources are shared, that is, assigned on an as-needed, first-come, first-served basis. When a burst of data comes in, resources are assigned for that burst. At the end of the burst of data, the resources are available for the next burst of data, regardless of the user. Since a customer's data can arrive at the switch at any time, packet switching is called asynchronous.

The present inventors have identified a number of problems with the prior art architectures and configurations discussed above. For example, a serious problem associated with the narrowband-broadband interface occurs with architectural changes from synchronous to asynchronous networks. The complexity of conversion for circuit-to-packet telephony or packet-to-circuit telephony within the domain of the network infrastructure, with no modification to existing digital circuit switches, can create unwanted interruption and unreliable services. The present inventors thus believe that the prior art telecommunications architectures and systems do not provide an adequate interface for narrowband and broadband communications and that improved telecommunication methods and systems are needed.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide improved switching capabilities for a telecommunications network.

It is another aspect of the present invention to provide improved combined circuit and packet switching capabilities for a telecommunications network.

It is yet another aspect of the present invention to provide improved methods and system for interfacing narrowband and broadband telecommunications functions with one another.

It is still another aspect of the present invention to provide improved methods and systems for communication among varying calling parties in multiple switches of a distributed telecommunications network.

The aforementioned aspects of the invention and other objectives and advantages can now be achieved as will now be summarized. Methods and systems for interfacing packet and circuit telephony operations in a distributed telecommunications network are disclosed herein. Initially, one or more digital circuit switches can be associated with the distributed telecommunications network. Thereafter, one or more network transmission elements within the distributed telecommunications network can be connected to one or more of the digital circuit switches. One or more broadband switches can then be associated with one or more of the network transmission elements, such that broadband switches thereof interface with the network transmission elements and the digital circuit switches to coordinate combined circuit and packet signaling, routing and calling processing services among terminals of the distributed telecommunications network.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
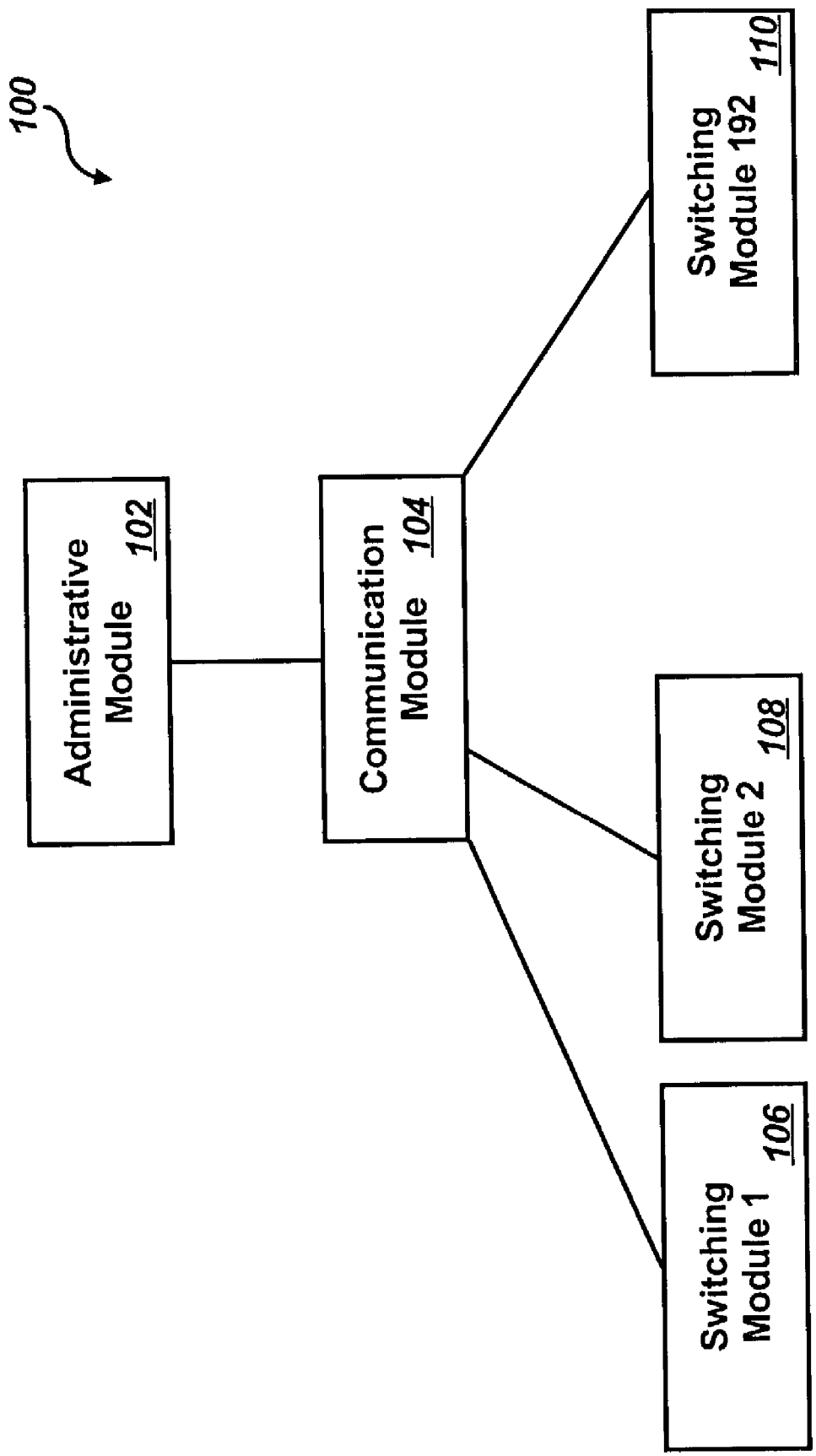
FIG. 1 depicts a block diagram generally illustrative of a prior art telecommunication circuit switch network associated with a switch office.
Figure 2:
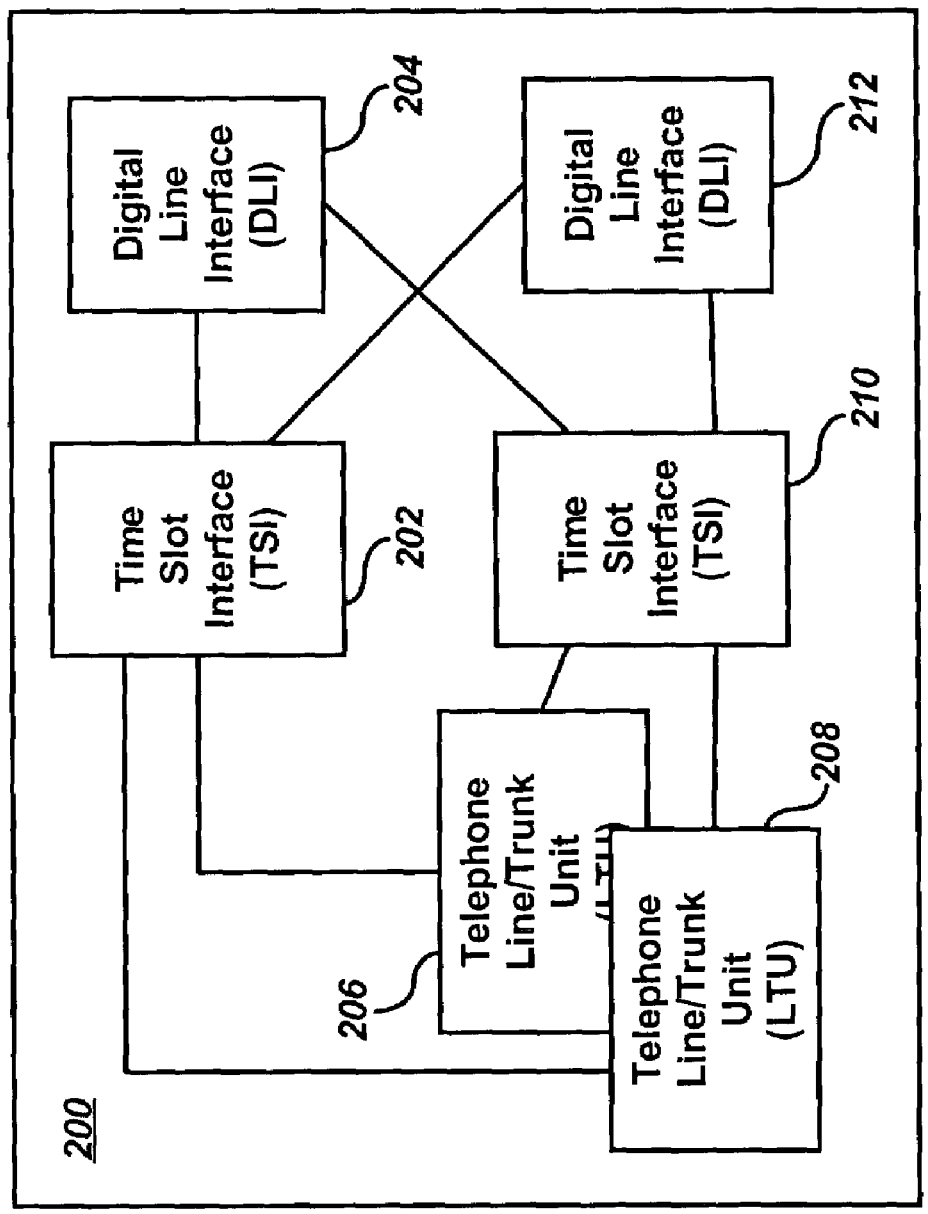
FIG. 2 illustrates a block diagram illustrative of a prior art switching module of a digital circuit switch.
Figure 3:
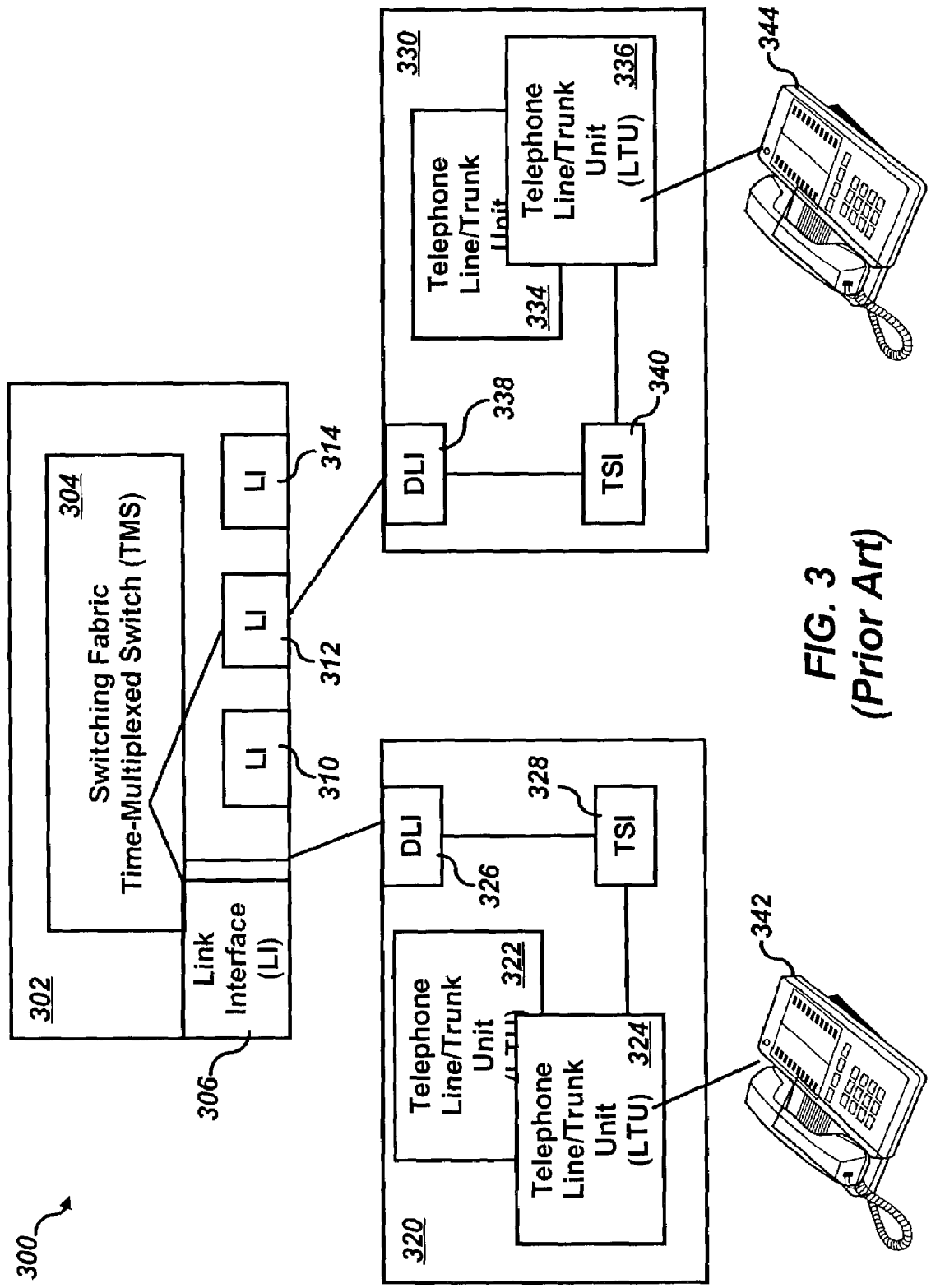
FIG. 3 depicts a block diagram generally illustrating prior art approaches to circuit telephony systems utilized in telecommunication switch networks.
Figure 4:
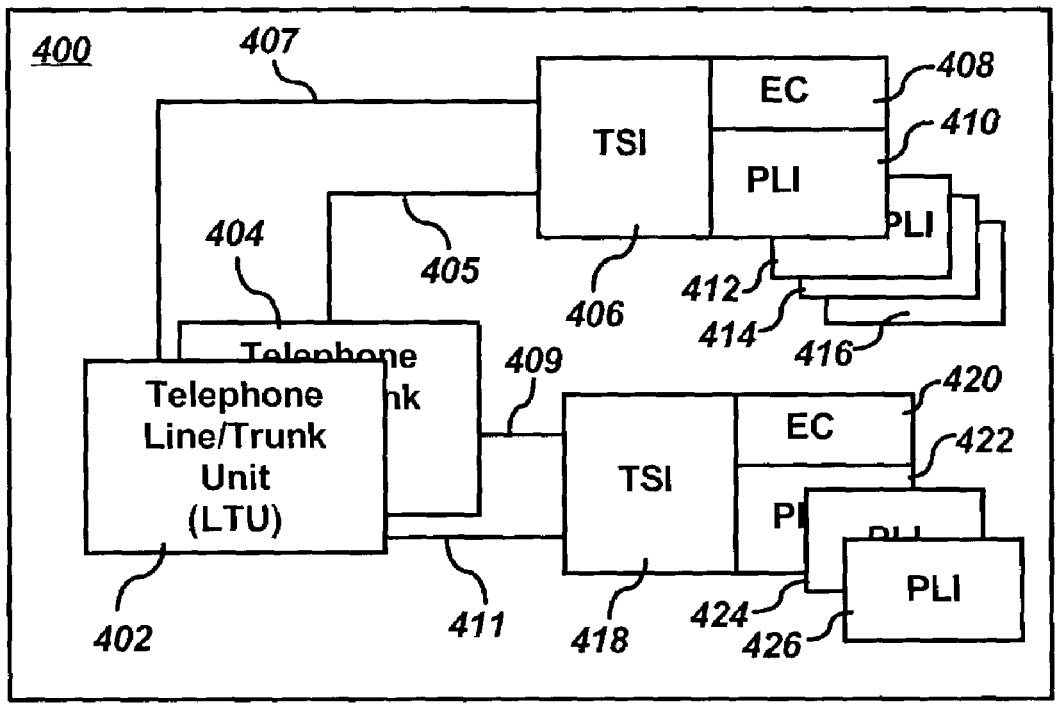
FIG. 4 illustrates a block diagram of a switching module, which can be implemented in accordance with an embodiment of the present invention.

FIG. 4 illustrates a block diagram of a switching module 400, which can be implemented in accordance with an embodiment of the present invention. Switching module 400 generally includes a telephone line/trunk unit (LTU) 402 which can communicate with a time slot interface (TSI) 418, which in turn is associated with an ethernet card (EC) 420 and a peripheral line interface (PLI) 422. TSI 418 and EC 420 can also be associated with one or more peripheral line interfaces 424 and/or 426. It can be appreciated by those skilled in the art a number of other PLI's can also be associated with TSI 418 and/or EC 420, depending upon particular telecommunications design and architectural considerations. The number of PLI's discussed here is not considered a limiting feature of the present invention, but is presented for general illustrative and edification purposes only.

Switching module 400 can also include an LTU 404, which can communicate with TSI 418 and/or a TSI 406. LTU 402 can communicate with TSI 418 utilizing communications line 411, while LTU 404 can communicate with TSI 418 via communications line 409. Similarly, LTU 402 can communicate with TSI 406 utilizing a communications line 407, while LTU 404 can communicate with TSI 406 via a communications line 405. TSI 406 can further be associated with a PLI 410 and/or an EC 408. Additionally, TSI 406 and/or EC 408 can be associated with PLI's 412, 414 and/416.

Figure 5:
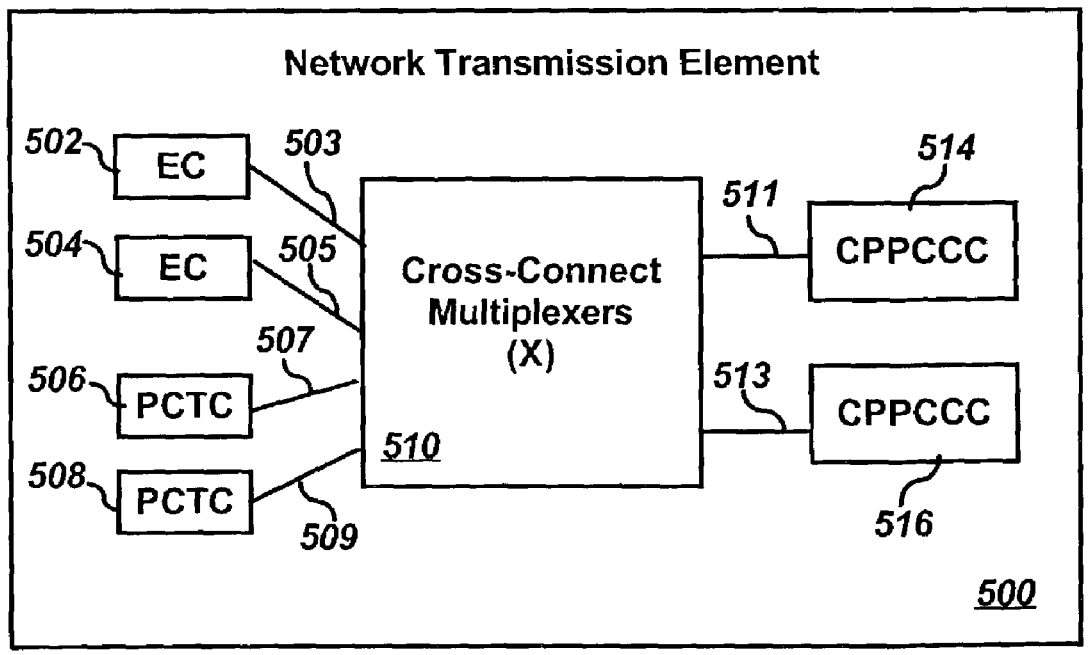
FIG. 5 depicts a block diagram of a network transmission element having narrowband and broadband hardware interface capabilities, in accordance with an embodiment of the present invention.

FIG. 5 depicts a block diagram of a network transmission element 500 having narrowband and broadband hardware interface capabilities, in accordance with an embodiment of the present invention. Network transmission element 500 generally includes a peripheral and control timing card (PCTC) 508, which can communicate with a plurality of cross-connect multiplexers 510.

Additionally, network transmission element 500 includes a PCTC 506, an EC 502, and an EC 504, which also can communicate with the plurality of cross-connect multiplexers 510. EC 502 can communicate with the cross-connect multiplexers via line 503, while EC 504 similarly can communicated with the cross-connect multiplexers via line 505. PCTC 506 can communicate with cross-connect multiplexers utilizing line 507, and similarly, PCTC 509 can communicate with cross-connect multiplexers via line 509. Network transmission element 500 further includes a circuit-packet or packet-circuit conversion card (CPPCCC) 514, which communicates with cross-connect multiplexers 510 via a line 511. Similarly, network transmission element 500 can also include a CPPCCC 516 that can communicate with cross-connect multiplexers 510 via a line 513.

Figure 6:
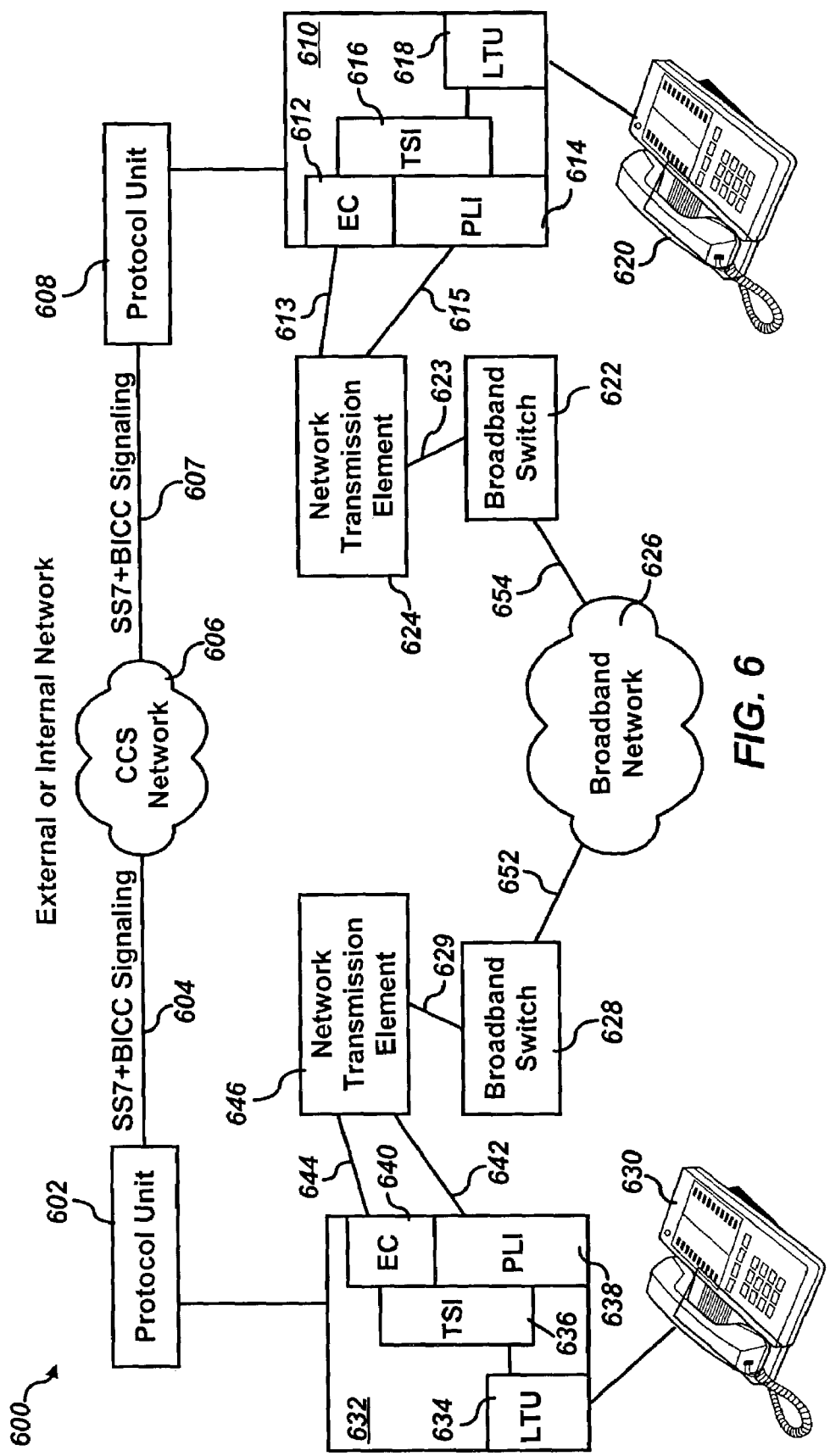
FIG. 6 illustrates a block diagram of a telecommunications system composed of circuit and packet telephone long distance and metropolitan digital switches, formed in part from switching modules and protocol units, in accordance with an embodiment of the present invention.

FIG. 6 illustrates a block diagram of a telecommunications system 600 composed in part from circuit and packet telephone switching modules, in accordance with an embodiment of the present invention. The redundancy and reliability architecture of the switching modules is implicit in the diagram. System 600 is composed of a switching module 632 that is generally analogous to the switching module 400 depicted in FIG. 4. Switching module 632 thus includes an LTU 634, which communicates with a TSI 636 that is associated with at least one EC 640 and at least one PLI 638. Switching module 632 is generally associated with a terminal 630 (i.e., a telephone). Switching module 632 can also communicate with a network transmission element 646 via a line 644 in the form of an IPDC, or other device control protocol, message.

It can be appreciated by those skilled in the art that respective communications from the switching modules 632 and/or 610 to the network transmission elements 646 and/or 624 are generally not implemented as standard external trunks, at least from the perspective of a digital switch. For example, an ISUP trunk to network transmission elements 646 and/or 624 is not a requirement of one or more embodiments of the present invention. Embodiments of the present invention do require, however, that the digital switch possess knowledge of the fact that the interface to network transmission elements 646 and/or 624 is a TDM bearer channel (e.g., see lines 642 and 615) that is controlled by a protocol such as, for example, BICC, wherein the digital switch is aware that it is interfacing with a bearer independent network implemented in ATM, IP, etc.

Thus, for example, a broadband switch 628 can communicate with switching module 632 via network transmission element 646 and a TDM circuit, which is generally represented in FIG. 6 by a line 642. Similarly, broadband switch 622 can communicate with switching module 610 via network transmission element 624 and a TDM circuit represented by line 615. Note that communications between broadband switch 622 and network transmission element 624 can occur over a communications line 623. Similarly, communications between broadband switch 628 and network transmission element 646 can occur over a communications line 629. Additionally, communications between broadband switch 628 and broadband network 626 can occur over a communications line 652, while communications between broadband switch 622 and broadband network 626 generally can occur over a communications line 654.

Note that a broadband switch, such as broadband switch 628 can be configured as an ATM switch. The acronym "ATM" as utilized herein generally refers to ATM (asynchronous transfer mode), which is a dedicated-connection switching technology that organizes digital data into 53-byte cell units and transmits them over a physical medium using digital signal technology. Individually, a cell is processed asynchronously relative to other related cells and is queued before being multiplexed over the transmission path. The pre-specified bit rates for ATM systems are either 155.520 Mbps or 622.080 Mbps. Speeds on ATM networks can reach 10 Gbps. Along with Synchronous Optical Network (SONET) and several other technologies, ATM is a key component of broadband ISDN (BISDN). Those skilled in the art can appreciate, however, that the use of an ATM switch is not considered a limiting feature of the present invention. A broadband switch, such as broadband switches 628 or 622, can be implemented in other contexts. The present invention is not confined the utilization of ATM as a broadband switching technology. For example, an IP packet network could be utilized in place of an ATM switching network. Thus, reference to ATM switches and networks herein is made for illustrative and edification purposes only.

Note that network transmission elements 646 and 624 are generally analogous to the network transmission element 500 of FIG. 5. Broadband switch 628 generally can communicate with switching module 632 via network transmission element 646. Communications between network transmission element 646 and switching module 632 can take place over lines 642 and 644. Line 642 can be implemented, for example, as a TDM circuit, while line 644 can be implemented via a communication link such as carry Ethernet frames and IPDC communications. Similarly, network transmission element 624 can communicate with broadband switch 622. Broadband switch 628 and broadband switch 622 can communicate with one another utilizing a broadband network 626 (e.g., an ATM core network or an IP packet network), thereby promoting packet telephony capabilities thereof. Broadband switch 622 can additionally communicate with a switching module 610 via network transmission element 624. Switching module 610 generally communicates with network transmission element 624 via lines 613 and 615, which can respectively be configured (although not necessarily) as IPDC and TDM communication mechanisms. Line 615 can represent, for example, a TDM circuit, while line 613 can represent communications in the form of an IPDC message carried in an Ethernet frame. In general, all communications between a digital switch as represented by switching modules 632 and/or 610 and a broadband switch as represented by broadband switch 628 and/or 622 occur through the network transmission elements 646 and/or 624.

It can be appreciated by those skilled in the art that broadband network 626 can be composed of a plurality of broadband nodes. For example, one type of a broadband network that can be utilized in association with the embodiments discussed herein may be based on Lucent's CBX 500™ Multiservice wide area network (WAN) Switch and/or PacketStar™ PSAX Broadband Multiservice Media Gateways. This particular type of ATM core network can be constructing over an existing SDH (Synchronous Digital Hierarchy) infrastructure, which enables a telecommunications provider to offer services to business and/or residential customers, such as voice, data, video and broadcasting services. It can be appreciated by those skilled in the art that features such as Lucent's CBX 500™ multiservice wide area network (WAN) Switch and/or PacketStar™ PSAX Broadband Multiservice Media Gateways are discussed herein for illustrative purposes only and are not considered limiting features of the present invention.

Switching module 610 is generally analogous to the switching module 400 of FIG. 4, and includes at least one EC 612, at least one PLI 614, which are both associated with a TSI 616 that in turn can communicate with an LTU 618. A terminal 620 (e.g., a telephone) is generally associated with switching module 610. Switching module 610 additionally can communicate with a protocol unit 608, which in turn can communicate with external or internal network 606 (e.g., a CCS network). Similarly, switching module 632 can communicate can communicate with a protocol unit 602, which in turn can communicate with the external or internal network 606. Communication between protocol unit 602 and network 606 can take the form of SS7 and BICC signaling, as represented by line 604. Similarly, communications between protocol unit 608 and network 606 can take place via SS7 and BICC signaling, as represented by line 607.

Note that the term "SS7" refers generally to the signaling system 7 (SS7) protocol promulgated by the Consultative Committee for International Telegraph and Telephone (CCITT) or by the American National Standards Institute (ANSI). The acronym "BICC," on the other hand refers to the Bearer Independent Call Control (BICC), which is a signaling protocol based on N-ISUP that is generally utilized to support narrowband ISDN service over a broadband backbone network without interfering with interfaces to the existing network and end-to-end services. BICC is fully compatible with existing networks and any system capable of carrying voice messages. BICC generally supports narrowband ISDN services independently of bearer and signaling message transport technology.

Figure 7:
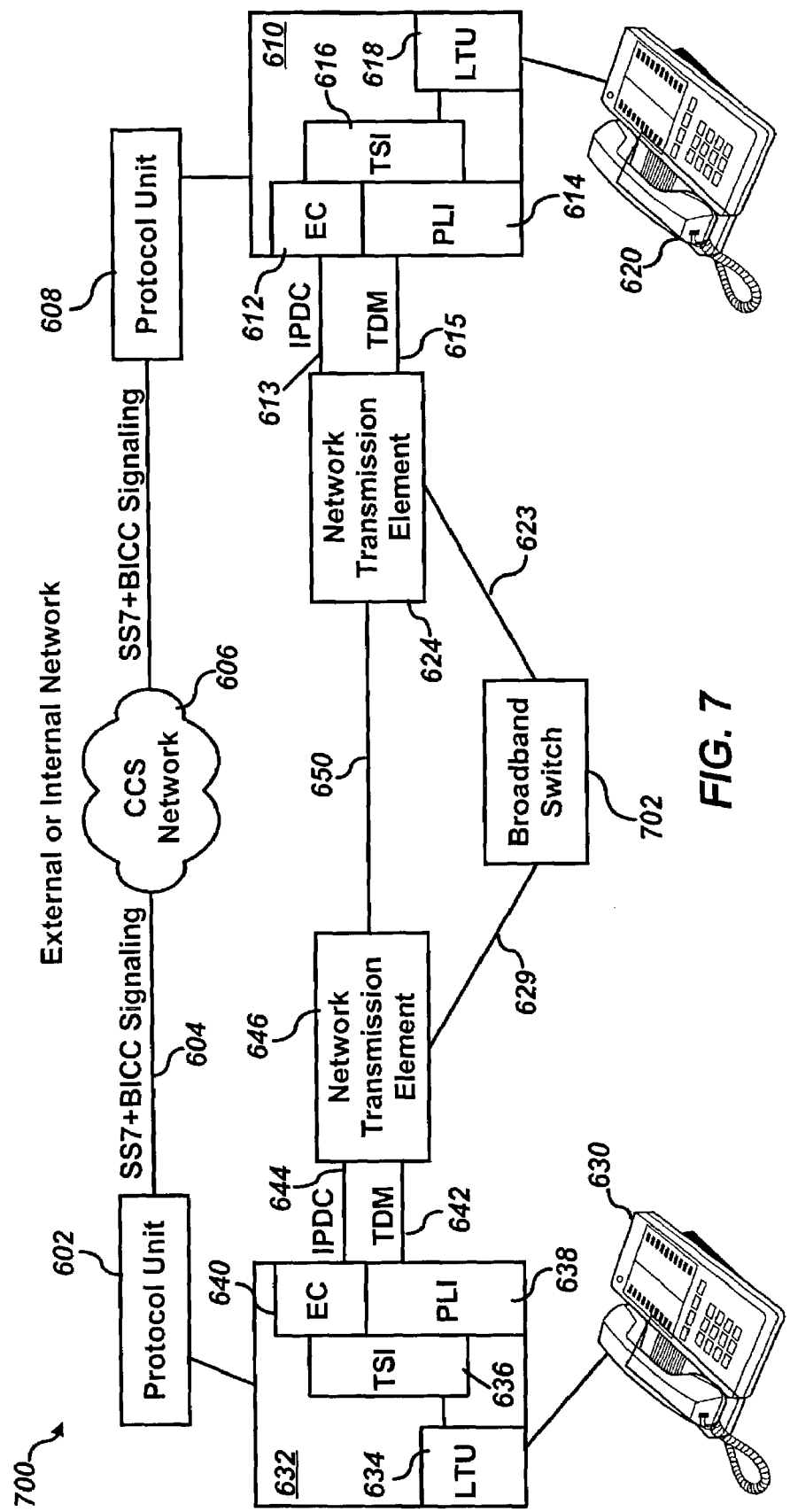
FIG. 7 depicts a block diagram of a telecommunications system composed of circuit and packet telephone long distance and metropolitan digital switches, formed in part from switching modules and protocol units, in accordance with an embodiment of the present invention.

FIG. 7 depicts a block diagram of a telecommunications system 700 composed of circuit and packet telephone digital switches, in accordance with an alternative embodiment of the present invention. Note that in FIGS. 6 and 7, identical or analogous parts or elements are generally depicted by identical reference numerals. Thus, the system 700 of FIG. 7 does not include a broadband network 626, or broadband switches 628 or 622. Instead, system 700 includes the same network transmission elements 646 and 624, which can communicate with a broadband switch 702. In general, broadband switch 702 depicted in FIG. 7 can communicate with network transmission element 646 via a communications line 629. Additionally, broadband switch 702 of FIG. 7 can communicate with network transmission element 624 via a communications line 623. An optional communications path may also exist in some embodiments of the present invention between network transmission elements 646 and 624, as indicated by line 650. It can be appreciated by those skilled in the art, however, that line 650 and any communications thereof between network transmission elements 646 and 624 are optional components only, and are not considered limiting features of the present invention.

Figure 8:
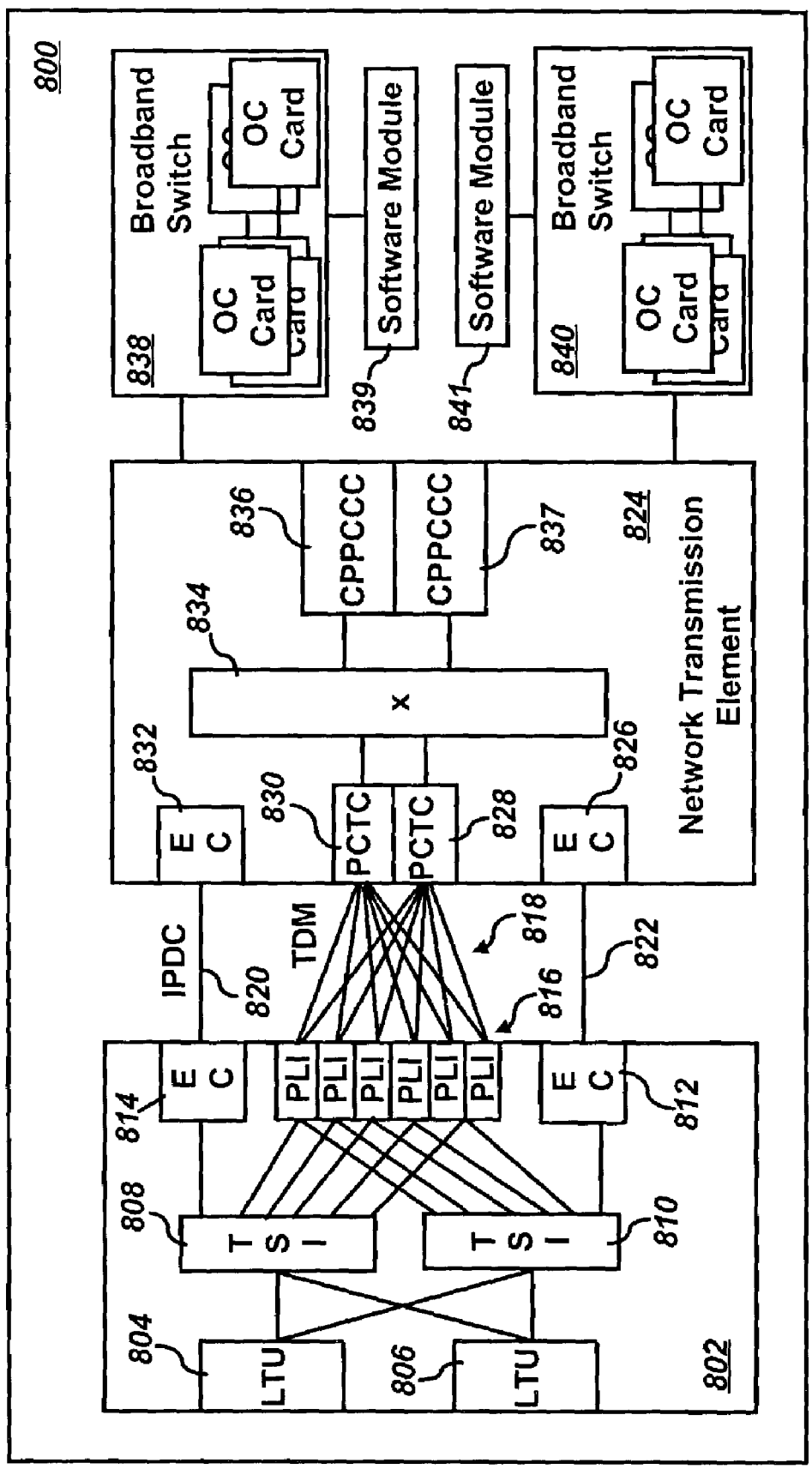
FIG. 8 illustrates a block diagram illustrative of a system that includes the interconnection of a switching module and a network transmission element, in accordance with an embodiment of the present invention.

FIG. 8 illustrates a block diagram illustrative of a system 800 that includes the interconnection of a switching module and a network transmission element, in accordance with an embodiment of the present invention. System 800 includes a network transmission element 824 that communicates with a switching module 802. Note that switching module 802 represents an alternative switch embodiment from the switching module 400 of FIG. 4. Thus, switching module 802 includes an LTU 804 and LTU 806. LTU 804 can communicate with a TSI 808 and/or a TSI 810. TSI 808 can in turn can communicate with an EC 814 and a plurality of PLI's 815. Similarly, LTU 806 can communicate with a TSI 810 and/or TSI 808. TSI 810 can in turn can communicate with an EC 812 and the plurality of PLI's 816. Note that redundant communications paths are thus available between LTU's 804 and 806 and TSI's 808 and 810. Redundant communications paths are also available between TSI's 808 and 810 and the plurality of PLI's 816.

Network transmission element 824 includes an EC 832 and an EC 826. EC 832 of network transmission element 824 can communicate with EC 814 of switching module 802. Similarly, EC 826 of network transmission element 824 can communicate with EC 812 of switching module 802. Communications between EC 826 and 812 generally take place over a line 822, while communications between EC 832 and EC 814 generally take place over a line 820 in the form of IPDC protocol signals.

Additional communications between network transmission element 824 and switching module 802 can take place over a TDM circuit, which is generally represented by a grouping of lines 818, which comprise redundant communications paths thereof. Network transmission element 824 also includes a PCTC 830 and a PCTC 828, which respectively communicate with one or more cross-connect multiplexers 834 that in turn are connected to a CPPCCC 836 and CPPCCC 837. System 800 additionally includes a broadband switch 838 and a broadband switch 840. Each broadband switch 838 and 840 can be composed of a plurality of interconnected OC cards.

It can be appreciate by those skilled in the art that a variety of types of broadband switches can be utilized in place of broadband switches 838 and 840, such as, for example, ATM switches. It can also be appreciated by those skilled in the art that each broadband switch 838 and 840 can respectively be associated with one or more software modules, such as software modules 839 and 841. The use of such software modules 839 and 841 is of course optional and is not considered a limiting feature of the present invention. Note that the term "module" as utilized herein generally refers to a software module, but may also refer to hardware equipment (i.e., physical modules), which may or may not operate independently of specific software.

Thus, the terms "module" and "software module" can be utilized interchangeably to refer to the same general function. In the computer programming and telecommunications arts, a "module" can be implemented as a collection of routines and data structures that performs particular tasks or implements a particular abstract data type. Modules generally are composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module can be based. Thus, when referring to a "module" herein, the present inventors are referring so such software modules or implementations thereof.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for interfacing packet and circuit telephony operations in a distributed telecommunications network, said method comprising the steps of:
   communicatively coupling at least one network transmission element within said distributed telecommunications network with at least one digital circuit switch and at least one broadband switch, such that said at least one broadband switch interfaces with said at least one network transmission element and said at least one digital circuit switch to coordinate combined circuit and packet signaling, routing and calling processing services among terminals of said distributed telecommunications network; and
   configuring said at least one network transmission element to comprise:
      at least one peripheral circuit and timing card (PCTC) and at least one ethernet card;
      at least one packet-to-circuit conversion card; and
      a plurality of cross-connect multiplexers that permit data communications between said at least one PCTC, said at least one ethernet card and said at least one packet-to-circuit conversion card;
   wherein an interface from the at least one digital circuit switch to the at least one network transmission element is a bearer channel controlled by a Bearer Independent Call Control (BICC) protocol.

2. The method of claim 1 further comprising the step of configuring said at least one digital circuit switch to comprise
   at least one Telephone Line/Trunk Unit (LTU) communicatively coupled with at least one interface unit that comprises a time slot interface (TSI) communicatively coupled with an ethernet card and at least one peripheral line interface (PLI).

3. The method of claim 1 wherein the step of configuring said at least one network transmission element further comprises the step of configuring said at least one network transmission element to comprise:
   at least one peripheral circuit and timing card (PCTC) and at least one ethernet card;
   at least one circuit-to-packet conversion card; and
   a plurality of cross-connect multiplexers that permit data communications between said at least one PCTC, said at least one ethernet card and said at least one circuit-to-packet conversion card.

4. The method of claim 1 further comprising the step of:
   communicatively coupling said at least one digital circuit switch is with a protocol unit that permits communication between at least one terminal connected to said at least one digital circuit switch and an external telecommunications network in communication with said protocol unit.

5. The method of claim 1 further comprising the step of:
   communicatively coupling said at least one digital circuit switch with a protocol unit that permits communication between at least one terminal connected to said at least one digital circuit switch and an internal telecommunications network in communication with said protocol unit.

6. The method of claim 1 wherein said distributed telecommunications network comprises a metropolitan packet telephony service and a long distance packet telephony service.

7. The method of claim 6 wherein said long distance packet telephony service comprises a broadband network communicatively coupling with said at least one broadband switch.

8. The method of claim 1 further comprising the step of configuring said at least one broadband switch to comprise at least one optical cable (OC) card and at least one software module in communication with said at least one OC card to provide broadband switching capabilities thereof.

9. A method for interfacing packet and circuit telephony operations in a distributed telecommunications network, said method comprising the steps of:
   communicatively coupling at least one digital circuit switch with said distributed telecommunications network;
   connecting at least one network transmission element within said distributed telecommunications network to said at least one digital circuit switch;
   communicatively coupling at least one broadband switch with said at least one network transmission element; and
   interfacing at least one broadband switch with said at least one network transmission element and said at least one digital circuit switch to coordinate combined circuit and packet signaling, routing and calling processing services among terminals of said distributed telecommunications network;
   wherein an interface from the at least one digital circuit switch to the at least one network transmission element is a bearer channel controlled by a Bearer Independent Call Control (BICC) protocol; and
   wherein said at least one network transmission element comprises:
      at least one peripheral circuit and timing card (PCTC) and at least one ethernet card;
      at least one packet-to-circuit conversion card; and
      a plurality of cross-connect multiplexers that permit data communications between said at least one PCTC, said at least one ethernet card and said at least one packet-to-circuit conversion card.

10. The method of claim 1 wherein the at least one broadband switch is an asynchronous transfer mode (ATM) switch.

11. The method of claim 1 wherein the at least one broadband switch is an Internet Protocol (IP) switch.

12. A system for interfacing packet and circuit telephony operations in a distributed telecommunications network, said system comprising:
   at least one digital circuit switch communicatively coupled with said distributed telecommunications network, wherein said distributed telecommunications network comprises a metropolitan packet telephony service and a long distance packet telephony service;
   at least one network transmission element within said distributed telecommunications network communicatively coupled with said at least one digital circuit switch; and
   at least one broadband switch communicatively coupled with said at least one network transmission element, wherein said at least one broadband switch interfaces with said at least one network transmission element and said at least one digital circuit switch to coordinate combined circuit and packet signaling, routing and calling processing services among terminals of said distributed telecommunications network;
   wherein an interface from the at least one digital circuit switch to the at least one network transmission element is a bearer channel controlled by a Bearer Independent Call Control (BICC) protocol; and wherein said at least one network transmission element comprises:
- at least one peripheral circuit and timing card (PCTC) and at least one ethernet card;
- at least one packet-to-circuit conversion card; and
- a plurality of cross-connect multiplexers that permit data communications between said at least one PCTC, said at least one ethernet card and sad at least one packet-to-circuit conversion card.

13. The system of claim 12 wherein said at least one digital circuit switch comprises:
at least one Telephone Line/Trunk Unit (LTU) communicatively coupled with at least one interface unit that comprises a time slot interface (TSI) communicatively coupled with an ethernet card and at least one peripheral line interface (PLI).

14. The system of claim 12 wherein said at least one network transmission element comprises:
- at least one peripheral circuit and timing card (PCTC) and at least one ethernet card;
- at least one circuit-to-packet conversion card; and
- a plurality of cross-connect multiplexers that permit data communications between said at least one PCTC, said at least one ethernet card and said at least one circuit-to-packet conversion card.

15. The system of claim 12 wherein said at least one digital circuit switch is communicatively coupled with a protocol unit that permits communication between at least one terminal connected to said at least one digital circuit switch and an external telecommunications network in communication with said protocol unit.

16. The system of claim 12 wherein said at least one digital circuit switch is communicatively coupled with a protocol unit that permits communication between at least one terminal connected to said at least one digital circuit switch and an internal telecommunications network in communication with said protocol unit.

17. The system of claim 12 wherein said distributed telecommunications network comprises a metropolitan packet telephony service and a long distance packet telephony service.

18. The system of claim 17 wherein said long distance packet telephony service comprises a broadband network communicatively coupled with said at least one broadband switch.

19. The system of claim 12 wherein said at least one broadband switch comprises at least one optical cable (OC) card.

20. The system of claim 19 wherein said at least one broadband switch further comprises at least one software module in communication with said at least one OC card to provide broadband switching capabilities thereof.

* * * * *